(12) United States Patent
Burch et al.

(10) Patent No.: US 10,182,074 B2
(45) Date of Patent: *Jan. 15, 2019

(54) TECHNIQUES FOR VIRTUAL REPRESENTATIONAL STATE TRANSFER (REST) INTERFACES

(71) Applicant: Micro Focus Software Inc., Wilmington, DE (US)

(72) Inventors: Lloyd Leon Burch, Payson, UT (US); Douglas Garry Earl, Orem, UT (US); Jonathan Paul Bultmeyer, Dorchester, MA (US); Carolyn B. McClain, Springville, UT (US)

(73) Assignee: Micro Focus Software, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/719,386

(22) Filed: May 22, 2015

(65) Prior Publication Data

US 2015/0281286 A1    Oct. 1, 2015

Related U.S. Application Data

(63) Continuation of application No. 12/608,389, filed on Oct. 29, 2009, now Pat. No. 9,049,182.

(60) Provisional application No. 61/232,981, filed on Aug. 11, 2009.

(51) Int. Cl.
| | | |
|---|---|---|
| H04L 29/06 | (2006.01) |
| G06F 7/04 | (2006.01) |
| G06F 17/00 | (2006.01) |
| G06F 12/14 | (2006.01) |
| H04L 9/32 | (2006.01) |
| G06Q 10/10 | (2012.01) |

(52) U.S. Cl.
CPC ............ *H04L 63/20* (2013.01); *G06Q 10/10* (2013.01); *H04L 63/0281* (2013.01); *H04L 63/08* (2013.01); *H04L 63/0884* (2013.01)

(58) Field of Classification Search
CPC . H04L 63/20; H04L 63/0281; H04L 63/0884; H04L 63/08; G06Q 10/10
USPC .................... 726/1, 7, 12, 22; 713/153, 168
See application file for complete search history.

(56) References Cited

U.S. PATENT DOCUMENTS

| | | | |
|---|---|---|---|
| 6,775,700 B2 | 8/2004 | Cheng et al. |
| 7,437,145 B2 | 10/2008 | Hamada |
| 9,049,182 B2 | 6/2015 | Burch et al. |
| 2001/0052013 A1 | 12/2001 | Munguia et al. |
| 2002/0026507 A1 | 2/2002 | Sears et al. |
| 2003/0115421 A1 | 6/2003 | McHenry et al. |

(Continued)

*Primary Examiner* — Aravind K Moorthy
(74) *Attorney, Agent, or Firm* — Schwegman Lundberg & Woessner, P.A.

(57) ABSTRACT

Techniques for virtual Representational State Transfer (REST) interfaces are provided. A proxy is interposed between a client and a REST service over a network. The proxy performs independent authentication of the client and provides credentials to the client and for the client to authenticate to the REST service using a REST service authentication mechanism. The proxy inspects requests and responses and translates the requests and responses into formats expected by the client and the REST service. Moreover, the proxy enforces policy and audits the requests and responses occurring between the client and the REST service over the network.

17 Claims, 5 Drawing Sheets

(56) References Cited

U.S. PATENT DOCUMENTS

| | | | |
|---|---|---|---|
| 2005/0177730 A1* | 8/2005 | Davenport | G06F 21/41 |
| | | | 713/182 |
| 2006/0015358 A1* | 1/2006 | Chua | G06Q 20/02 |
| | | | 705/44 |
| 2006/0200503 A1 | 9/2006 | Dosa et al. | |
| 2006/0224742 A1 | 10/2006 | Shahbazi | |
| 2007/0156842 A1 | 7/2007 | Vermeulen et al. | |
| 2008/0028457 A1 | 1/2008 | Diaz-Cuellar et al. | |
| 2008/0034099 A1* | 2/2008 | Kageyama | H04L 29/12367 |
| | | | 709/228 |
| 2008/0077705 A1* | 3/2008 | Li | H04L 47/10 |
| | | | 709/236 |
| 2008/0140861 A1 | 6/2008 | Kothari et al. | |
| 2008/0141339 A1* | 6/2008 | Gomez | H04L 63/08 |
| | | | 726/1 |
| 2008/0263215 A1* | 10/2008 | Schnellbaecher | H04L 63/0281 |
| | | | 709/229 |
| 2008/0289049 A1* | 11/2008 | Morris | G06F 17/30867 |
| | | | 726/28 |
| 2008/0319757 A1 | 12/2008 | Da Palma et al. | |
| 2008/0319761 A1 | 12/2008 | Da Palma et al. | |
| 2009/0006614 A1* | 1/2009 | Le | H04L 67/025 |
| | | | 709/224 |
| 2009/0119763 A1* | 5/2009 | Park | H04L 63/0815 |
| | | | 726/8 |
| 2009/0292806 A1 | 11/2009 | Depue et al. | |
| 2010/0228987 A1* | 9/2010 | Dinov | G06F 21/41 |
| | | | 713/183 |
| 2011/0041171 A1 | 2/2011 | Burch et al. | |

* cited by examiner

TECHNIQUES FOR VIRTUAL REPRESENTATIONAL STATE TRANSFER (REST) INTERFACES

RELATED APPLICATIONS

The present application is a continuation of U.S. patent application Ser. No. 12/608,389, filed on Oct. 29, 2009, which claims the benefit of priority under 35 U.S.C. 119(e) to U.S. Provisional Patent Application Ser. No. 61/232,981; entitled: "Techniques for Virtual Representational State Transfer (REST) Interfaces," and filed on Aug. 11, 2009; each of which is incorporated by reference herein and below in its entirety.

BACKGROUND

Increasingly, information is being moved over networks, such as the Internet, to conduct affairs of individuals, governments, and enterprises. Devices are more powerful and mobile, such that network connectivity can be acquired from nearly any spot on the globe on demand by any individual.

Information access has largely been successful because of the advent of the World-Wide Web (WWW) and the communication techniques associated therewith. One such popular communication architecture and technique for WWW communications is a Representational State Transfer (REST) interface.

A REST interface is an architectural style and communication technique deployed for clients and servers to interact with one another over the Internet. Clients initiate requests that are processed by servers and responses are returned from the servers to the clients. Requests are in the form of nouns (resource identifiers) and verbs (actions) that are to be taken on the nouns. The vocabulary for the verbs are constrained to a few universal verbs, such as GET, PUT, POST, and DELETE. The nouns are used for uniquely identifying a resource over the Internet, such as by an Internet Protocol (IP) Address in the form of a Uniform Resource Locator (URL) link or Uniform Resource Identifier (URI).

Conversely, other WWW protocols exist that give greater customized control over the actions used by developers; one such popular protocol is the Simple Object Access Protocol (SOAP).

More feature/function can be achieved with greater developer control when actions (verbs) can be user-defined for any given situation. However, with the increased feature/function comes the loss of interoperability. That is, two or more resources (nouns) are harder to seamlessly interface with one another over the Internet when the potential actions (verbs) increase and are not controlled. Enterprises appear to prefer ease of integration over increased feature/function.

Thus, REST interfaces are growing in the industry at significant rates. Some suggest that over 80% of major WWW providers offer REST as a means to interface with their assets over the Internet. REST is in fact replacing SOAP-based services as the preferred architecture of enterprises. One main reason for this is that the Application Programming Interface (API) for REST is easy to understand, constrained, and simple to use. This simplicity of integration also has some drawbacks.

For example, because REST interfaces are simplistic: the security with REST interfaces is limited; the auditing with REST interfaces is difficult to achieve; and the merging of multiple REST interfaces to interoperate with one another takes customized programming to achieve.

Accordingly, what is needed is improved flexibility with REST interface architectures.

SUMMARY

In various embodiments, techniques for virtual Representational State Transfer (REST) interfaces are presented. More specifically, and in an embodiment, a method for using a virtual REST interface is provided. Specifically, a proxy device is configured to act as an intermediary between a client and a REST service executing on a server of the network. Next, a REST formatted request, which is being sent from the client to the REST service, is intercepted by the proxy device and an enterprise policy is enforced, at the proxy device, against the REST formatted request. Finally, the REST formatted requested is provided, by the proxy device, to the REST service when the enterprise policy is satisfied for the REST service to process on behalf of the client. The REST service then processed the request and a response is returned to the proxy device. Policy evaluation can then dictate whether the response is modified, audited, and/or logged.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "network node" or "node" refers to a physical or virtual (virtual machine) processing device, such as but not limited to, a router, a network bridge, a hub, a network switch, a server, a proxy, a client, etc.

A "proxy," "proxy service," and/or "proxy device" may be used interchangeably herein and below. The proxy executes on a network node and in some cases may be viewed as the network node. A proxy can be a reverse proxy, in which case the server vending content over the network is unaware that the reverse proxy is acting as an intermediary between the sever and clients of the server. That is, the server is not pre-configured to interact with the reverse proxy. In another case, the proxy is a forward proxy, with respect to the server; so, the server is configured to receive requests and communicate responses through the forward proxy.

In either case, the proxy, as used herein, is local to the server and is unknown to the clients accessing the server over the network. The clients are not preconfigured to directly interact with the proxy. The clients indirectly interact with the proxy by trying to contact the server and having the proxy intercept and process the clients' requests unbeknownst to the clients.

Various embodiments of this invention can be implemented in existing network architectures. For example, in some embodiments, the techniques presented herein are implemented in whole or in part in the Novell® network and/or proxy server products, distributed by Novell®, Inc., of Provo, Utah.

Also, the techniques presented herein are implemented in machines, such as processor or processor-enabled devices. These machines are configured to specifically perform the processing of the methods and systems presented herein. Moreover, the methods and systems are implemented and reside within computer-readable storage media and are processed on the machines configured to perform the methods.

Of course, the embodiments of the invention can be implemented in a variety of architectural platforms, proxies, devices, server systems, and/or applications. Any particular architectural layout or implementation presented herein is provided for purposes of illustration and comprehension only and is not intended to limit aspects of the invention.

Figure 1:
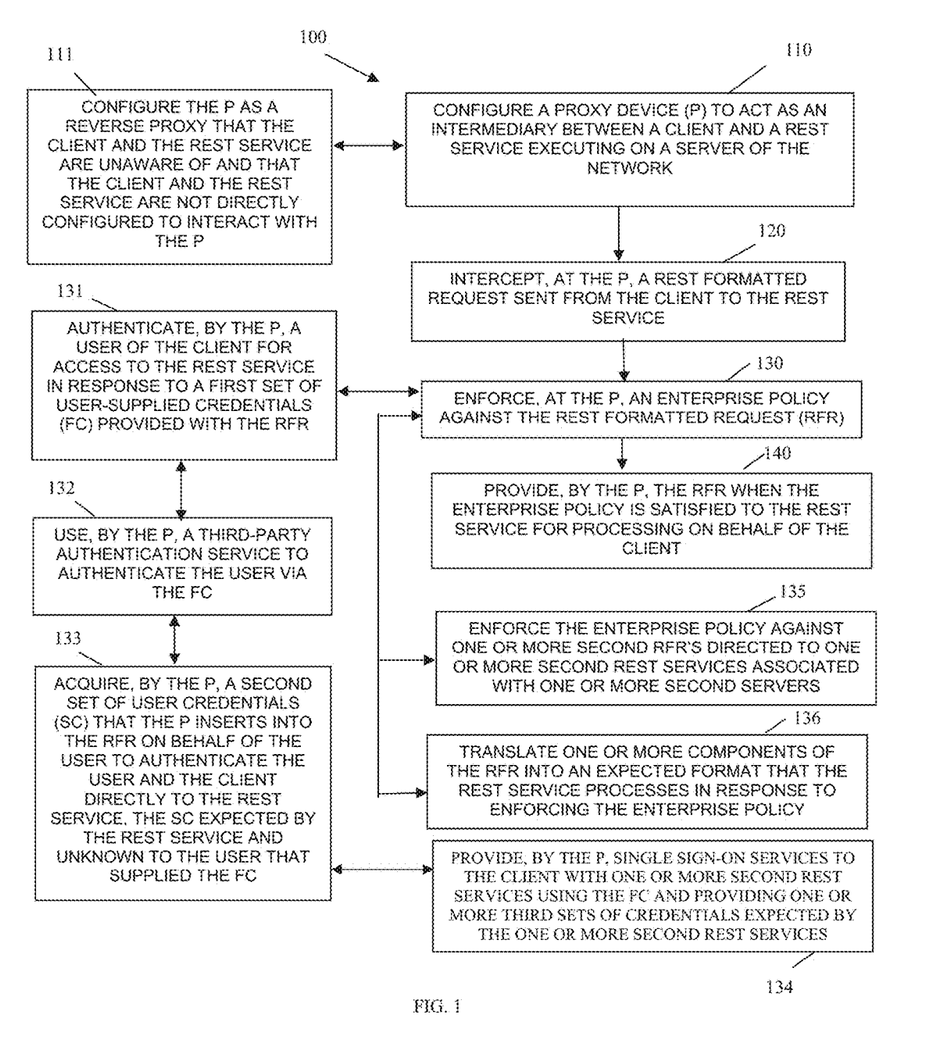
FIG. 1 is a diagram of a method for using a virtual Representational State Transfer (REST) interface, according to an example embodiment.
Figure 2:
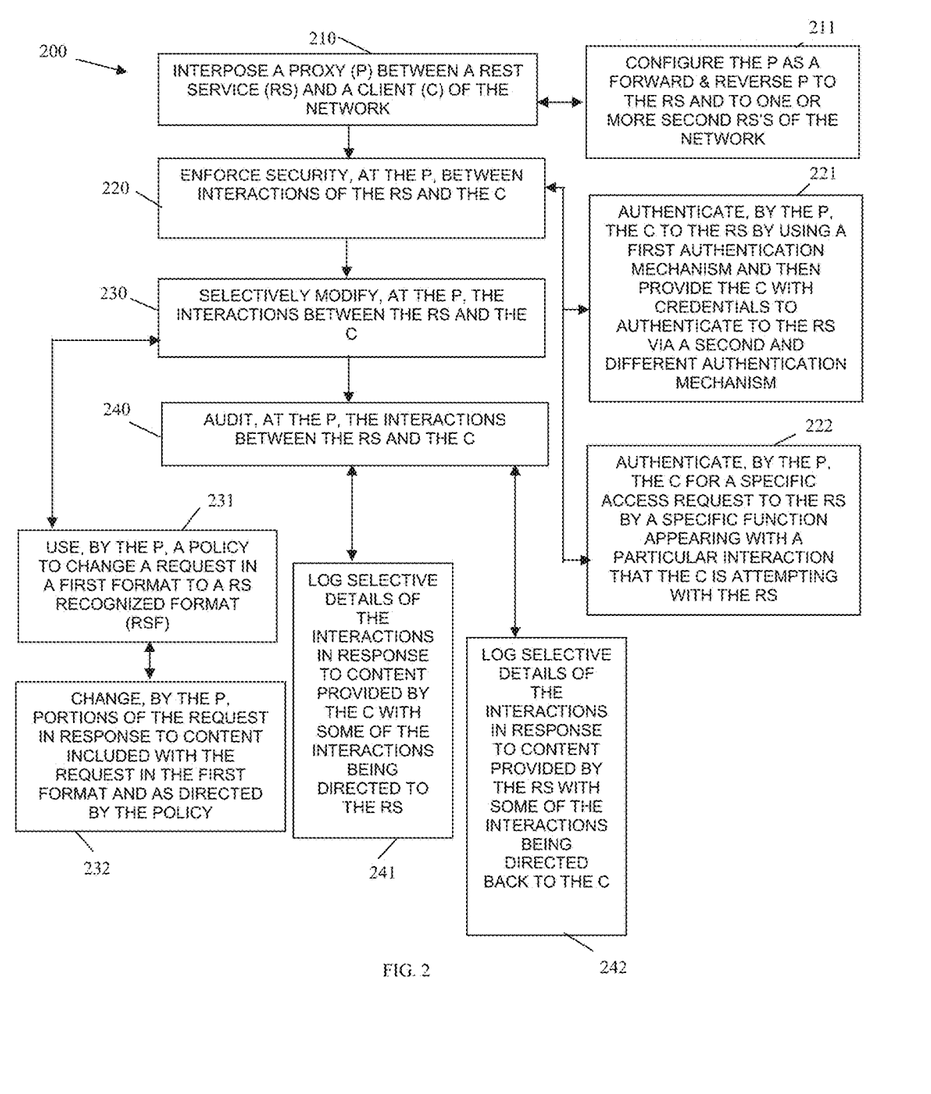
FIG. 2 is a diagram of another method for using a virtual REST interface, according to an example embodiment.
Figure 3:
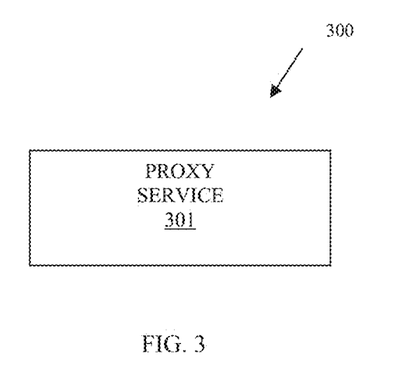
FIG. 3 is a diagram of a virtual REST interface system, according to an example embodiment.

It is within this context that embodiments of the invention are now discussed within the context of FIGS. 1-3.

FIG. 1 is a diagram of a method 100 for using a virtual Representational State Transfer (REST) interface, according to an example embodiment. The method 100 (hereinafter "REST proxy service") is implemented in a machine-accessible and computer-readable medium and instructions that execute on one or more processors (machines, computers, processors, etc.). The machine is specifically configured to process the REST proxy service. Furthermore, the REST proxy service is operational over and processes within a network, such as the Internet, etc. The network may be wired, wireless, or a combination of wired and wireless.

At 110, the REST proxy service configures a proxy device to act as an intermediary between a client and a REST-enabled service (hereinafter "REST service"). The REST service executing on a server of the network. So, the REST proxy service executes on a proxy device or node of a network. In an embodiment, the proxy device is contained within a firewalled environment of an enterprise and is configured to handle interactions occurring with the firewalled environment and the external Internet. That is, external communications coming into the firewalled environment are intercepted and processed by the REST proxy service and internal communications that are being sent out of the firewalled environment over the Internet are intercepted and processed by the REST proxy service.

According to an embodiment, at 111, the REST proxy service configures the proxy device as a reverse proxy. Both the client and the REST service are unaware of the reverse proxy. Furthermore, neither the client nor the REST service is pre-configured to directly interact with the reverse proxy.

At 120, the REST proxy service intercepts, at the proxy device, a REST-formatted request that is being sent from the client to the REST service. This includes the noun and verb format expected by the REST service. Again, the client is unaware of the REST proxy service and believes that the client is interacting with the desired REST service.

At 130, the REST proxy service enforces, at the proxy device, an enterprise policy against the REST-formatted request sent from the client. The policy is any single or set of conditions and events defined by an enterprise and automatically evaluated by the REST proxy service, these conditions or events are associated with actions that the REST proxy service takes when the conditions or events evaluate to true and/or false. So, policy enforcement by the REST proxy service permits an enterprise to: implement its own security with respect to REST services, integrate different REST services, audit REST service interactions, and the like. This is done in an automated and dynamic manner via the REST proxy service.

In an embodiment, at 131, the REST proxy service authenticates, by the proxy device, a user of the client for access to the REST service. This is done using or in response to a first set of user-supplied credentials provided by the user with the REST-formatted request. So, the user believes that the first set of user-supplied credentials is being used by the REST service to authenticate the user for access. However, this is not the case; the REST proxy service uses the first set of user-supplied credentials to authenticate the user for access to the enterprise network, which includes access to the REST service. So, the authentication performed is for the user to access the enterprise network and not necessarily for the user to directly authenticate to the REST service. The REST proxy service takes care of this authentication.

Continuing with the embodiment of 131 and at 132, the REST proxy service uses a third-party authentication service to authenticate the user via the first set of user-supplied credentials. In other words, an external identity service performs authentication on behalf of the enterprise network and that authentication is managed and controlled via the REST proxy service.

Still continuing with the embodiment of 132 and at 133, the REST proxy service subsequently acquires a second set of user credentials that the REST proxy service inserts into the original REST-formatted request on behalf of the user to authenticate the user and the client of the user directly to the REST service. So, the user and the client of the user are unaware of what is being supplied to the REST service for authentication. The user believes the original first set of user-supplied credentials was used to directly interact and authenticate the user with the REST service. However, this is not the case, the REST proxy service uses the first set of user-supplied credentials to authenticate the user and the client to the enterprise environment and then the REST proxy service acquires some securely managed second set of credentials on behalf of the user and supplies this second set of credentials to the REST service. The REST service expects and recognizes the second set of credentials and authenticates the REST-formatted request in response to the second set of credentials. The enterprise may use a corporate set of credentials in this scenario to log in or authenticate the user to the REST service via the second set of credentials, which are never actually known to or provided to the user.

In another situation associated with the embodiment of 133 and at 134, the REST proxy service provides single sign-on services to the client with one or more second REST services by using the first set of user-supplied credentials to ensure the user is authenticated to the enterprise network and then distributing one or more third sets of credentials expected by one or more second REST services managed by the enterprise. So, here the user provides just the initial first set of user-supplied credentials and the REST proxy service manages other credentials that the REST proxy service provides on behalf of the user so that the user can access multiple different REST services. Each REST service can use different and disparate authentication mechanisms. The user does not have to concern himself/herself with the mechanisms or managing the credentials because the REST proxy service, perhaps in connection with an identity service, manages the proper credentials and the authentication mechanisms needed by each of the REST services.

In still another situation, at 135, the REST proxy service enforces the enterprise policy against one or more second REST-formatted requests that are directed to one or more second REST services executing on one or more second servers of the network. So, the REST proxy service acts as a merging mechanism or interface to permit a single front-end access to a user, via the client of the user; the front-end interface managed by the REST proxy service to handle REST formatted requests to multiple different and disparate REST servers executing on different network servers.

In a particular situation, at 136, the REST proxy service translates one or more components of the REST-formatted request into an expected format that the REST service processes. That is, the nouns and/or verbs of the REST-formatted request can be inspected by the REST proxy service and in accordance with actions defined in the enterprise policy these nouns and/or verbs can be translated into nouns and/or verbs that the REST service expects to see. This scenario permits the REST proxy service to manage multiple disparate REST services and ensure that each REST service is receiving a REST-formatted request in the proper expected format. Basically, the nouns and verbs are received from the user in a normalized format, which the REST proxy service matches to conditions in the policy in order to map the normalized format to specific formats expected by the desired REST service.

At 140, the REST proxy service provides the REST-formatted request to the REST service when the enterprise policy is satisfied. The REST service then processes the request and returns a response. The response is then processed by the REST proxy service in a similar manner to ensure it conforms to the enterprise policy, is authenticated, and is in a format the user or client of the user expects. Some additional examples of this situation with regard to the REST service response are provided herein and below with the discussion of the remaining FIGS.

FIG. 2 is a diagram of another method 200 for using a virtual REST interface, according to an example embodiment. The method 200 (hereinafter "proxy service") is implemented in a machine-accessible and computer-readable storage medium as instructions that execute on one or more processors of a network node. The network memory service is operational over a network. The network may be wired, wireless, or a combination of wired and wireless. Furthermore, the processor is specifically configured to process the proxy service.

The proxy service represents another and in some cases enhanced perspective of the REST proxy service represented by the method 100 of the FIG. 1.

At 210, the proxy service interposes a proxy between a REST service and a client of a network.

According to an embodiment, at 211, the proxy service configures the proxy as both a forward proxy and a reverse proxy to the REST service and to one or more second REST service's of the network. It is noted, that the proxy can be forward, reverse, of forward and reverse.

In some cases, the proxy service may also configure the proxy as a forward proxy to the REST service (not shown in FIG. 2).

At 220, the proxy service enforces security, at the proxy, between interactions of the REST service and the client. That is, security, such as authentication, is independently enforced by the proxy service outside the normal scope of REST processing between a client and a REST server. This is done via the proxy service acting as an intermediary to the REST service and the client.

In an embodiment, at 221, the proxy service authenticates the client to the REST service by using a first authentication mechanism and then provides the client with credentials to authenticate to the REST service via a second authentication mechanism. The first and second authentication mechanisms are different and disparate from one another. So, an enterprise can enforce its own enterprise security via the proxy service implementing and enforcing the first authentication mechanism and then once that is satisfied, the proxy service can provide the client with credentials for satisfying the second authentication mechanism expected and used by the REST service.

In a specific case, at 222, the proxy service authenticates the client for a specific access request to the REST service by identifying a specific function call (verb and resource combination) appearing with a particular interaction (REST-formatted request) that the client is attempting to achieve with the REST service. Here, the proxy service inspects interactions (requests) for specific access requests and can flag these requests for special authentication treatment. Thus, granular authentication can be achieved via the proxy service down to a function call level.

At 230, the proxy service selectively modifies interactions between the REST service and the client. Here, the proxy service inspects REST-formatted requests for noun and verb usage and formats and based on specific formats, nouns, and/or verbs selectively takes actions to modify the requests (interactions). This provides customized control to the proxy service for servicing multiple REST services and for enforcing enterprise policy because before any request is sent to the REST service or before any response returned from a REST service is sent to the client, the proxy service has control and can inspect the payloads and take customized actions in an automated and dynamic fashion.

According to an embodiment, at 231, the proxy service uses a policy to change a request in a first format to a REST service recognized format. In other words, a policy instructs the proxy service on how to translate to a user or client-supplied request into a specific REST format request.

Continuing with the embodiment of 231 and at 232, the proxy service changes portions of the request in response to content included with the request in the first format and as directed by the policy. The proxy service can inspect the actual nouns and verbs being used in the request and change them as directed by policy.

At 240, the proxy service audits the interactions occurring between the REST service and the client. So, specific and customized auditing can occur in an automated fashion for an entire enterprise's REST-enabled services, via the proxy service.

For example, at 241, the proxy service logs selective details of the interactions between the client and the REST service based on the content provided by the client with some of the interactions being directed to the REST service. Here, the proxy service views the contents of the requests (interactions) made by the client to the REST service and based on the content and evaluation of policy, some of the details are logged for later review and evaluation.

In another case, at 242, the proxy service logs selective details of the interactions in response to content provided by the REST service with some of the interactions being directed back to the client. So, the interactions can be the requests made by the clients that are REST compliant and other of the interactions are the responses made by the REST service back to the client. In the embodiment of 242, the response details are inspected by the proxy service and based on the contents selective information is logged for subsequent evaluation and/or analysis.

FIG. 3 is a diagram of a virtual REST interface system 300, according to an example embodiment. The virtual REST interface system 300 is implemented in a machine-accessible and computer-readable storage medium as instructions that execute on one or more processors (multi-processor) and that is operational over a network. The one or more processors are specifically configured to process the components of the virtual REST interface system 300. Moreover, the network may be wired, wireless, or a combination of wired and wireless. In an embodiment, the virtual REST interface system 300 implements, among other things, certain aspects of the methods 100 and 200 represented by the FIGS. 1 and 2, respectively.

The virtual REST interface system 300 includes a proxy service 301.

The proxy service 301 is implemented in a computer-readable storage medium and is to execute on a proxy of the network. Example processing features associated with the proxy service 301 were presented in detail above with reference to the methods 100 and 200 of the FIGS. 1 and 2, respectively.

The proxy service 301 is configured to act as an intermediary between clients of a network and REST servers for purposes of authenticating client requests, translating the client requests, and enforcing enterprise policy against the client request.

The proxy service 301 is also configured for purposes of authenticating REST server responses, translating the REST server responses, and enforcing the enterprise policy against the REST server responses.

According to an embodiment, the proxy service 301 authenticates the client requests and the REST server responses using an enterprise authentication mechanism. The enterprise authentication mechanism is independent of separate authentication mechanisms used by the REST servers.

Continuing with the prior embodiment, the proxy service utilizes the separate authentication mechanisms expected by the REST servers once the enterprise authentication mechanism is satisfied. The clients are unaware of the separate authentication mechanisms expected by the REST servers.

In a particular situation, the clients and the REST servers are unaware of the proxy service 301 and are not configured for direct interaction with the proxy service 301.

Figure 4:
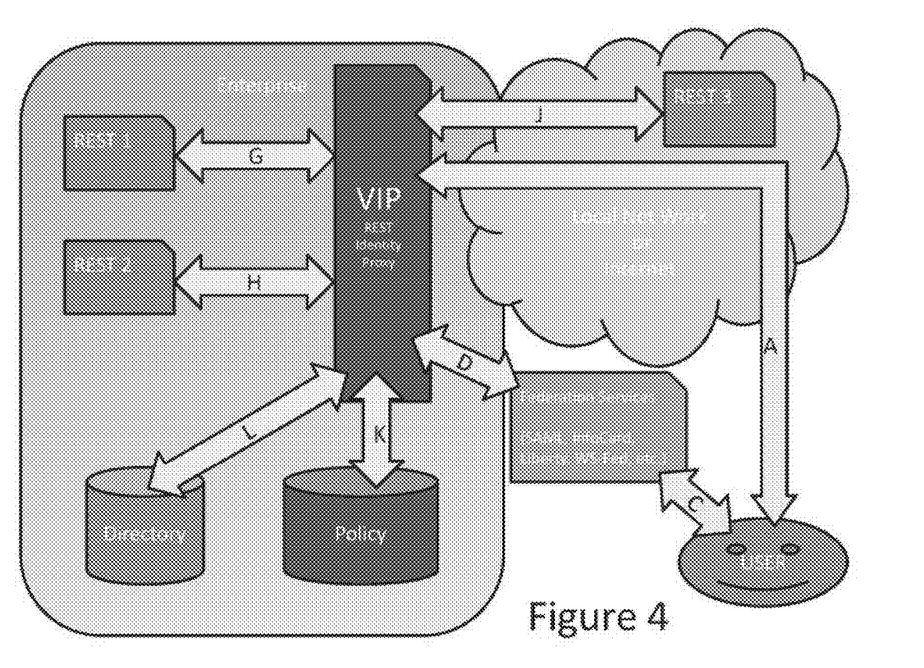
FIGS. 4-5 are example flow diagrams depicting interactions between various components of a virtual REST interface system, according to some example embodiments.
Figure 5:
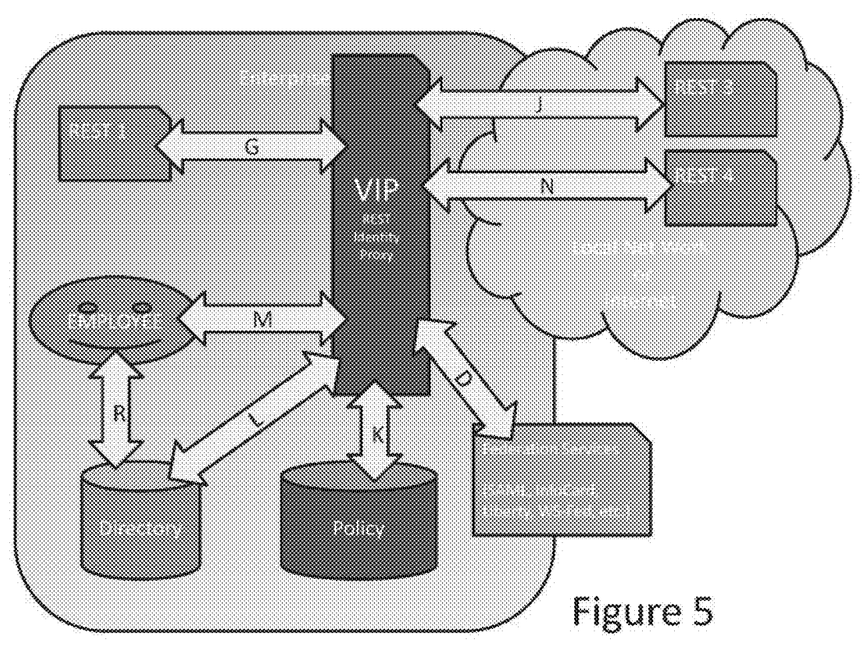

FIGS. 4-5 are example flow diagrams depicting interactions between various components of a virtual REST interface system, according to some example embodiments.

The FIGS. 4-5 are now discussed with reference to a variety of scenarios. It is noted that other scenarios are possible and that the discussed scenarios are done so for purposes of illustration and to highlight some significantly beneficial situations that embodiments of the invention provide for.

Scenario "1A" is using FIG. 4 and proceeds as follows:
1) The "USER" application needs to access the "REST1" REST service. This is done via the USER going to "A" which goes to RIP (USER-A-RIP). It is noted that the processing associated with RIP has been discussed in detail above with reference to the FIGS. 1-3.
2) The RIP now checks policy to see what "in-bound" authentication is needed for the function requested at the "REST1" service. The REST function is determined by policy using the REST noun (URL) and REST method (POST, GET, etc.) This inbound authentication can be done using nothing, identifier and password combination, Security Assertion Markup Language (SAML), InfoCard, WS-Fed, WS-Trust, Liberty, or anything supported by the RIP and allowed by policy.
3) If the authentication is token based the USER application can use a federation service via "C".
4) The RIP now validates the credentials sent by the USER application. This may be done via "L", "K" or "D" based on the type authentication sent. After the inbound authentication is complete the RIP uses policy, (K) to determine the "out-bound" authentication requirement for the REST service requested.
5) The RIP then uses "L", "K", "D" and/or information given via "A" to build the required authentication and sends it to "REST1" via G (G-REST1). It is noted that the "in-bound" and "out-bound" authentications may be different and are joined via policy at the RIP.
6) The USER application is then allowed access to the "REST1" service with the authentication from the RIP.
7) The USER application now needs to access "REST3" and does this via "A" (USER-A-RIP)
8) The RIP repeats steps 2-4 as above.
9) The RIP then may use a single identifier and password combination for REST3. This password is not given to the USER but is sent to the REST3 service and used to authenticate.
10) Access is not granted to the USER application.

Scenario "1B" is using FIG. 2 and proceeds as follows.
1) The Employee application needs to access REST1 and REST3.
2) The employee authenticated his computer (client) when it was turned on using Kerberos (R-Directory).
3) The employee application access the RIP via "M" with a URL to REST1 (EMPLOYEE-M-RIP).
4) The Kerberos tickets are exchanged and validated (M-RIP, RIP-L).
5) User data is looked up and composed into a token sent to REST1.
6) Access is granted to REST1.
7) Steps 2-4 are now repeated
8) Policy now chooses how to authenticate the user application to REST3.

In summary, scenarios 1A and 1B provide techniques that use policy with an identity driven proxy (RIP) to define and validate REST requests without changes or knowledge to the REST service. The techniques use policy with an identity driven proxy to set and send authentication credentials to a REST service. The techniques also use policy with an identity driven proxy to provide single sign on to REST services that may have different authentication schemes. Additionally, the techniques use policy with an identity driven proxy to transform in-bound credentials from a user application to the required out-bound credentials needed by the REST service.

Scenario "2A" is using FIG. 1 and proceeds as follows.
1) The enterprise desires to offer a single REST interface to USERS. The interface is to be Java Specification Requests (JSR) 311 compliant and must be seen as a single REST endpoint by the user. So, there are three REST services that are to be merged or joined into a single service. REST1 and REST2 two are inside the enterprise firewall and REST3 is outside the firewall. REST2 is not JSR 311 compliant the other two (REST1 and REST3) are. The URL to the enterprise is zzyzx.com. Each of the REST services is to be seen with the same domain name.

2) The USER application accesses REST1 as "zzyzx.com/services/rest1/doFuncA" (A-RIP).

3) RIP uses policy to look up the service that is to be used and selects REST1 (RIP-K). The URL (noun) is transformed by policy to match syntax required by the service.

4) The request is forwarded by the proxy as "RealREST1address.com/MyStuff/doFunctionA" (RIP-G-REST1.

5) The REST service replies (REST1-G-RIP-A).

6) The USER application now does an http "GET" to REST2 with the following URL, "zzyzx.com/services/rest2/doFuncB" (A-RIP).

7) RIP uses policy to look up the service that is to be used and selects REST2 (RIP-K). The URL (noun) is transformed by policy to match syntax required by the service JSR 311. The "GET" and "POST" are compliant with JSR 311.

8) The request is forwarded by the proxy as RealREST2address.com/MyBadFormOfNounUsage/Other-RequiredPoorlyFr omedStuff/exucuteMySpecialCode. The http method is changed from a "GET" to a "POST" with the headers filled in.

9) The REST2 service replies and the RIP formats the reply to be compliant (REST2-H-RIP-A).

10) The USER application now accesses REST3 as "zzyzx.com/services/rest3/doFuncR" (USER-RIP).

11) The RIP use policy to send the request to REST3 (RIP-J-REST3).

12) REST3 replies to the RIP with the data in a "tag value" format (REST3-J-RIP).

13) The RIP executes policy and transforms the data to a "JASON" format.

14) The RIP then sends the reply to the USER application (RIP-A-USER).

Scenario 2A provides techniques that use policy with an identity driven proxy to merge multiple REST services to act as one without changes or knowledge to the REST services. The techniques use policy with an identity driven proxy to change in-bound requests to match the needs of the REST service. The data changed in the request may be the NOUNS, VERBS, or DATA sent. Additionally, the techniques use policy with an identity driven proxy to change out-bound requests to match the needs of the calling application. The data changed in the response may be the NOUNS, VERBS, or DATA sent.

Scenario "3A" is using FIG. 1 and proceeds as follows.

1) The enterprise desires to offer a REST interface to USERS. So, there are three REST services that are to be merged or joined into a single service. REST1 and REST2 two are inside the enterprise firewall and REST3 is outside the firewall. The URL to the enterprise is zzyzx.com. Each of the REST services is to be seen with the same domain name. To meet the need to be compliant, the company must be able to show an audit trail of how and who used the REST services offered by the enterprise.

2) The USER application access REST1 as "zzyzx.com/services/rest1/doFuncA" (A-RIP).

3) The RIP uses policy to understand the URL (NOUN) and method (VERB) of the request. Policy now transforms this information in to an audit event. The event can include any information that policy allows. This may include data on the request.

4) The RIP now forwards the request to the REST1 service (RIP-G-REST1)

5) The REST service responds back to the RIP (REST1-G-RIP)

6) The RIP now uses policy to evaluate the reply and may generate an audit event based on policy.

7) The reply is now sent to the USER application (RIP-A-USER)

Scenario 3A techniques use policy with an identity driven proxy to generate audit events based on the NOUNS used by REST application. The techniques use policy with an identity driven proxy to generate audit events based on the VERBS used by a REST application. The techniques also use policy with an identity driven proxy to generate audit events based on the payload data used by a REST application. Additionally, the techniques use policy with an identity driven proxy to generate audit events based on the response of REST application. All of the above does not require any changes to the REST services being audited.

Scenario "3B" is using FIG. 1 and proceeds as follows.

1) The enterprise desires to offer a REST interface to USERS. The there are three REST service that are to be merged or joined into a single service. REST1 and REST2 two are inside the enterprise firewall and REST3 is outside the firewall. The URL to the enterprise is zzyzx.com. Each of the REST services is to be seen with the same domain name. REST1 is to be open to all employees that authenticate, parts of REST2 are only available to employees with the ROLE of "Admin", and all of REST3 is public to all.

2) The USER application access REST1 as "zzyzx.com/services/rest1/doFuncA" (A-RIP).

3) The RIP uses policy to understand the URL (NOUN) and method (VERB) of the request. Policy is now used by the RIP to evaluates this information and map it to a "FUNCTION_TAG" defined by the administrator. An example of "FUNCTION_TAG" would be "GeneralEmployeeInfo". These tags can be anything the administrator desires to define.

4) The RIP uses policy to evaluate the "FUNCTION_TAG" to the authentication and/or roles required for access. If the conditions are met the request is forwarded to the REST service (RIP-G-REST1). If they are NOT met the request is denied (RIP-A-USER). The RIP may also, via policy, remove parts of the request before sending it on to the REST service.

5) The REST service responds to the request (REST1-G-RIP).

6) The RIP uses policy to filter the data on the response. If may remove any of all of the data being returned.

7) The RIP now forwards the response to the USER application (RIP-A-USER)

8) The same steps are repeated with REST2 and REST3.

Scenario 3B techniques use policy with an identity driven proxy to allow or deny REST access based on identity, roles, or other attributes of the requesting application. The techniques also use policy with an identity driven proxy to allow or deny access based on the REST requests. This can include NOUNS, VERBS, and other points of information.

In some cases of scenario 3B, the RIP uses policy with an identity driven proxy to map incoming requests to "FUNCTION_TAGS". These tags of labels can be built using policy and any data then sent on the requests of the RIP. Examples are URL, NOUNS, VERBS, TOD, Data format, Data content, etc.

Scenario 3B techniques use policy with an identity driven proxy to base access permissions on the identity of the application making the request and the "FUNCTION_TAG". Again, all of the above approaches do not require any changes at all to legacy REST services.

The techniques presented herein and above provide a variety of novel benefits, such as but not limited to: 1) allow policy to control the authentication of REST service without changes to the REST service (where normal and legacy authentication expected by the REST service can still be used separately by the REST service); 2) allow advanced authentication of a legacy REST service that does not support such methods of authentication (as described in (1) and above); 3) allow clients to call REST services without knowing how to authenticate; the authentication is done based on the identity known by the proxy; 4) allow a client to access REST services that are authenticated by a corporation via policy; a client can use a service such as "www.BooksOnline.com" and does not need to use or know the group password used by the corporation; 5) allow REST services to be accessed via "federated trust" without any changes to the REST service; 6) allow a client to access REST services via "federated trust" without change to the client code; 7) allow multiple REST services to appear as one service to clients; 8) allow policy to control what REST services are combined and joined; 9) allow a single REST noun form; policy provides URL transformation to provide a common syntax form even if the underlying services are different; 10) allow a single REST verb form; policy allows the Hypertext Transfer Protocol (HTTP) method of the REST call to be transformed, such as "POST" to "GET;" 11) allow REST service to be audited without changes to the service; 12) allow policy to determine what events are generated to the audit system; 13) allow policy to grant or deny access to REST services function, based on policy, with changes to the REST service; and/or 14) allow policy to grant or deny employees access to outside REST services via policy.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   transparently intercepting, by a server, a Representational State Transfer (REST) service request from a client within a local processing environment of the REST service, wherein the REST service request is sent from the client to a REST service to the REST service and the REST service request is a REST-formatted request;
   enforcing, by the server, enterprise policy against the REST service request, wherein enforcing further includes at least and independently enforcing security associated with the local processing environment as a portion of the enterprise policy, wherein the security is outside the scope of REST processing that is performed by the REST service when provided the REST service request;
   forwarding, by the server, the REST service request to the REST service when the enterprise policy is validated, wherein the REST service is unaware of the enforcement of the enterprise policy and assumes the REST service request is being sent directly from the client to the REST service, and wherein the client and the REST service were riot preconfigured to directly interact with the server and the client is unaware of the server; and
   processing the method on the server as a reverse proxy within a firewalled environment that is the local processing environment of the REST service and simultaneously processing the method as a transparent proxy to the client that is associated with an external processing environment that is external to the local processing environment.

2. The method of claim 1 further comprising, auditing, by the server, interaction between the client and the REST service.

3. The method of claim 1 further comprising, providing, by the server, single-sign on access to a second REST service for a user operating the client based on successful authentication of the user, by the server, to the REST service.

4. The method of claim 1 further comprising, authenticating, by the server, a user operating the client for access to the REST service by enlisting a third-party authentication service.

5. The method of claim 1, wherein enforcing further includes enforcing security restrictions as the enterprise policy against the REST service request.

6. The method of claim 5, wherein forwarding further includes enforcing the security restrictions for interactions between the client and the REST service after the REST service request is forwarded to the REST service.

7. The method of claim 1, wherein enforcing further includes evaluating an authentication policy that is defined by the enterprise policy, and authenticating a user operating the client in accordance with the authentication policy.

8. The method of claim 7, wherein evaluating further includes processing a second authentication mechanism that is different from that which was defined by the authentication policy to authenticate the user to the REST service.

9. The method of claim 8 further comprising, processing a third authentication mechanism from that which was defined by the authentication policy and the second authentication mechanism to authenticate the user to a second REST service for a second REST service request issued from the client.

10. A method, comprising:
    configuring a proxy as a proxy between a client of a network and two or more independent Representational State Transfer (REST) services, wherein configuring further includes configuring the proxy as a transparent proxy to the client and simultaneously configuring the proxy as a reverse proxy to the REST services, wherein configuring further includes configuring the proxy within a local processing environment of the REST services that is external to the client;

operating the proxy to present to the client as the REST services, wherein the client directs requests to the REST services during operation of the client, wherein the requests are REST-formatted requests;

enforcing, by the proxy during operation, policy against the requests for access made by the client to the REST services and against interactions between the client and the REST services, wherein the client and the REST services are not preconfigured for directly interacting with the proxy and the client and the REST services are unaware of the proxy, and wherein enforcing further includes at least and independently enforcing security associated with the local processing environment as a portion of the policy, wherein the security is outside the scope of any REST processing that is performed by the REST services when provided the requests; and processing the method for all REST service requests made by the client to any of the REST services of the local processing environment.

11. The method of claim 10, wherein enforcing further includes authenticating a user operating the client and the client to at least one of the REST services using a first set of credentials supplied by the user with a first request based on the enterprise policy.

12. The method of claim 11 further comprising, authenticating the user and the client to a different one of the REST services using a second set of credentials that was not supplied by the user in response to a second request issued from the user through the client for access to the different REST service.

13. The method of claim 10, wherein enforcing further includes enforcing custom enterprise security against the requests and the interactions, wherein the custom enterprise security defined in the enterprise policy.

14. The method of claim 10, wherein enforcing further includes auditing the requests and the interactions in response to enforcing the enterprise policy.

15. A system, comprising:
a hardware server configured with executable instructions residing in a non-transitory computer-readable medium, the executable instructions representing a proxy service; and the proxy service configured to:
i) execute on one or more processors of the hardware server, ii) intercept Representational State Transfer (REST) requests issued over a network connection from a client as REST-formatted requests, wherein the REST requests are received by the proxy server within a local processing environment associated with a plurality of REST services and the client associated with an external processing environment that is external to the local processing environment, the client making the REST requests to at least one of the REST services, and iii) enforce enterprise policy against the REST requests before forwarding the REST requests to the at least one of the REST services, and at least and independently enforce security associated with the local processing as a portion of the enterprise policy, wherein the security is outside the scope of REST processing that is performed by the REST services when provided the REST requests , wherein both the client and the REST services are unaware of the proxy service and neither the client nor the REST services are preconfigured for directly interacting with the proxy service, wherein the proxy service is a transparent proxy to the client and simultaneously a reverse proxy to the REST services.

16. The system of claim 15, wherein the proxy service is further configured to:
iv) provide single-sign on to a user operating the client to access the REST services with a single-set of user-supplied credentials, wherein each of the REST services require authentication for the user using different sets of credentials for the user.

17. e system of claim 15, wherein the proxy service is further configured to:
iv) enforce security restrictions defined in the enterprise policy against the REST requests, v) enforce the security restrictions against interactions between the client and the REST services, and vi) audit the REST requests and the interactions.

* * * * *

UNITED STATES PATENT AND TRADEMARK OFFICE
CERTIFICATE OF CORRECTION

PATENT NO. : 10,182,074 B2
APPLICATION NO. : 14/719386
DATED : January 15, 2019
INVENTOR(S) : Burch et al.

Page 1 of 1

It is certified that error appears in the above-identified patent and that said Letters Patent is hereby corrected as shown below:

In the Claims

In Column 12, Line 17, in Claim 1, delete "riot" and insert --not-- therefor

In Column 14, Line 20, in Claim 15, delete "requests ," and insert --requests,-- therefor In Column 14, Line 33, in Claim 17, delete "e" and insert --The-- therefor Signed and Sealed this
Twenty-eighth Day of April, 2020

Andrei Iancu
*Director of the United States Patent and Trademark Office*